May 8, 1962 A. H. SCHMIDT 3,033,144
WELDING APPARATUS
Filed Aug. 26, 1958
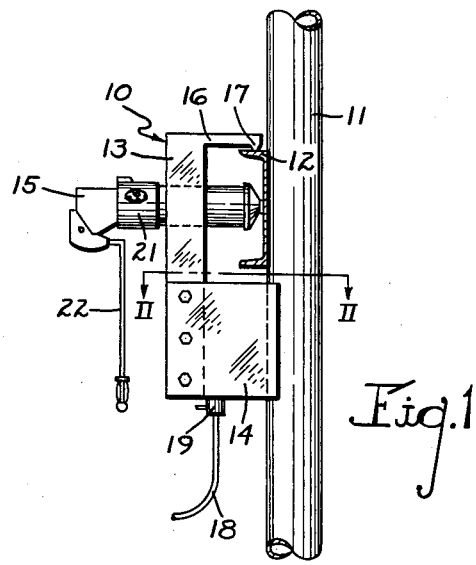
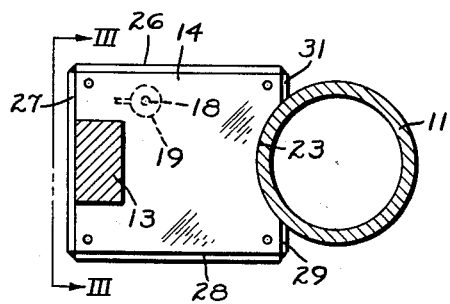
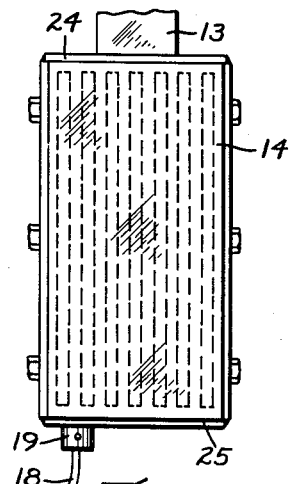
INVENTOR.
Alexander H. Schmidt
BY
Norman S. Blodgett
Attorney

United States Patent Office 3,033,144
Patented May 8, 1962

3,033,144
WELDING APPARATUS
Alexander H. Schmidt, West Boylston, Mass., assignor to Riley Stoker Corporation, Worcester, Mass., a corporation of Massachusetts
Filed Aug. 26, 1958, Ser. No. 757,394
2 Claims. (Cl. 113—99)

This invention relates to a welding apparatus, and more particularly to a device for drawing two bodies into welding position and clamping them in that position.

In certain welding operations, particularly those involving independently supported structural elements, it is sometimes difficult to bring the elements together for the welding operation. This is particularly true, for instance, in the case of water wall tubes and structural beams associated with a steam generating unit. In this case, the long vertical tubes in the water walls of the furnace have already been welded in place at the top and bottom, but it is also necessary to weld them to a fixed buckstay or channel which runs horizontally and transversely of the water wall. Since the ends of the tubes have already been fixed in place, the central portions of the tubes vary in their positions by considerable amounts, due to the warping and bending of the tubes which has taken place during various operations which have been performed on them. In running a channel along the outer surface of the water wall it is, of course, true that several of the tubes will contact the channel immediately and can be readily welded in place. The rest of the tubes, however, must be drawn into contact with the channel and held there while the welding operation is performed. In the past this has been accomplished by various expedients including placing a man inside the water wall and having him push the tube into place against the channel using sheer brute strength. In some places where the man's strength was not great enough, block and tackle were used to draw the tube into place and so on. It can be easily understood that such methods require a great deal of time and that the labor cost of a highly skilled worker, like a welder, is quite considerable and would not be used to solve the problem of drawing the tubes into place, if it were possible to avoid it. The present invention obviates these difficulties in a novel manner.

It is, therefore, an outstanding object of the present invention to provide a welding apparatus which is light, portable, and rugged in construction for drawing two bodies together during a welding operation.

Another object of this invention is the provision of a welding apparatus which does not require access to one side of the bodies which are to be welded together.

A still further object of the instant invention is the provision of welding apparatus for use in drawing the tubes of a steam generating unit into place against a buckstay or channel.

It is a further object of the invention to provide a welding apparatus which makes use of a magnet and a hydraulic jack to draw the water wall tubes of a steam generating unit into place for welding against a channel.

Another object of the invention is the provision of apparatus for drawing the individual tubes of the water wall of a steam generating unit into place against a channel for welding thereto, the apparatus also holding the tube against the channel during the welding operation.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

FIG. 1 is an elevational view of the invention,
FIG. 2 is a sectional view of the invention taken on the line II—II of FIG. 1, and
FIG. 3 is an elevational view of a portion of the invention taken on the line III—III of FIG. 2.

Referring first to FIG. 1, which best shows the general features of the invention, the welding apparatus, designated generally by the reference numeral 10, is shown in use with a tube 11 and a channel 12 associated with the water wall of a steam generating unit of the conventional type. In the construction of the water wall of the furnace it is necessary that each of the water wall tubes 11 be welded to the channel 12. The apparatus 10 consists of a body 13 to which are attached an electro-magnet 14 and a hydraulic jack 15. The body 13 is elongated and is provided at one end with an arm 16 extending laterally therefrom and provided at its outer end with a bearing abutment 17. At the end of the body 13 opposite the arm 16 is the electro-magnet 14 which is suitably fastened to the body and extends laterally therefrom in the same direction as the arm 16. The electro-magnet is provided with a conduit 18 extending to a source of electrical power which is preferably a six-volt battery. A suitable switch 19 is provided to energize or de-energize the electro-magnet, as the occasion demands. The hydraulic jack 15 is of a conventional, self-contained unit having a piston, a cylinder, a valve 21, and an actuating handle 22 for actuating an internal pump for forcing oil into the cylinder.

Referring to FIGS. 2 and 3, it can be seen that the electro-magnet is provided with a cylindrical concave surface 23 which conforms closely to the shape of a conventional boiler tube 11. The electro-magnet is provided with a laminated type construction, best shown in FIG. 3, and is totally enclosed by aluminum housing plates 24, 25, 26, 27, 28, 29, and 31, the iron core members being exposed in the area of the surface 23 to provide better magnetic action.

The operation of the apparatus will now be readily understood in view of the above description. Let us assume that the tube 11 is to be welded to a channel 12 which is situated midway between the top and bottom of the furnace, a point at which the greatest gap usually exists between the tube and the channel. The apparatus is placed with the surface 23 of the electro-magnet 14 contacting the outer surface of the tube 11, the jack 15 being in collapsed condition. If desired, the whole apparatus may be supported from the channel by resting the bearing abutment 17 of the arm 16 on the upper surface of the channel. The switch 19 is actuated to energize the electro-magnet and the latter attachs itself firmly to the tube. Then, the operator places the valve 21 in condition to cut off by-pass between the sides of the piston by turning the valve handle. He then moves the handle 22 to pump oil into the cylinder and to force the jack against the outer surface of the channel 12. Eventually, the tube 19 will be drawn toward the channel and will make contact therewith; the operator then welds the tube to the channel. After the weld is finished, the switch 19 is actuated to de-energize the electro-magnet and the whole apparatus can be moved to the next tube which is to be welded. It can be seen that in a water wall with up to one hundred separate tubes to be welded to its channel, it would be beneficial merely to slide the apparatus along the channel 12 by means of the contact between the abutment 17 and the channel, the apparatus progressing from one tube to another very quickly. Between welds and before the apparatus is moved, the jack 15 should be placed in its unextended condition, which means that the valve 21 should be open to permit the oil to by-pass from one side of the piston to the other, permitting the jack to collapse.

One of the distinct advantages of this apparatus is that it permits the welding operation to be entirely carried on from the outside of the water wall where staging is readily avaliable for the workmen. It also does away with the need for an extra man to enter the furnace and move the tube from the side opposite the weld, a procedure which is not only dangerous but also involves the wages of the additional man.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for assisting in welding a series of vertical boiler tubes to a horizontal beam in side-by-side relation, comprising an elongated body member, an electro-magnet connected to a source of electrical power attached to one end of the body member and extending outwardly therefrom, the magnet being shaped to conform to the surface of and to contact each of the boiler tubes one-by-one, the portion of the magnet which contacts the tube being a generally elongated, concave, semi-circular cylinder, a supporting arm extending from the other end of the body member and adapted to contact an upwardly-facing surface of the beam to support the apparatus and to permit it to be moved along the beam from one boiler tube to another, and a self-contained hydraulic jack attached to the intermediate portion of the body member and extending outwardly therefrom to contact the beam, the magnet and the jack cooperating to draw each tube to the beam and clamp it in place for the welding operation.

2. Apparatus for assisting in welding a series of vertical boiler tubes to a horizontal beam in side-by-side relation, comprising an elongated body member, an electro-magnet connected to a source of electrical power attached to one end of the body member and extending outwardly therefrom, the magnet being shaped to conform to the surface of and to contact each of the boiler tubes one-by-one, a supporting arm extending from the other end of the body member and adapted to contact an upwardly-facing surface of the beam to support the apparatus and to permit it to be moved along the beam from one boiler tube to another, and a self-contained jack attached to the intermediate portion of the body member and extending outwardly therefrom to contact the beam, the magnet and the jack cooperating to draw each tube to the beam and clamp it in place for the welding operation.

References Cited in the file of this patent

UNITED STATES PATENTS

| | | |
|---|---|---|
| 2,314,788 | Innes | Mar. 23, 1943 |
| 2,379,136 | Erwin et al. | June 26, 1945 |
| 2,546,458 | Launder | Mar. 27, 1951 |
| 2,641,212 | Meilstrup | June 9, 1953 |

OTHER REFERENCES

Product Engineering, published January 1943 (page 210 relied on). (Copy in Scientific Library and in Div. 37.)